United States Patent [19]

Ikeda et al.

[11] Patent Number: 4,925,511
[45] Date of Patent: May 15, 1990

[54] METHOD OF FITTING PLATE MEMBER WITH SUPPORTIVE OR PROTECTIVE MEMBER OF MOLDED RESIN

[75] Inventors: Hideo Ikeda, Tokyo; Yoshio Horiki; Yutaka Yamauchi, both of Matsusaka; Hiroshi Kasamatsu, Ota; Akimasa Akao, Kawagoe, all of Japan

[73] Assignees: Central Glass Company, Limited, Ube; Ikeda Glass Industrial Co., Ltd., Tokyo, both of Japan

[21] Appl. No.: 310,876

[22] Filed: Feb. 16, 1989

[30] Foreign Application Priority Data

Feb. 18, 1988 [JP] Japan .................................. 63-35700

[51] Int. Cl.⁵ .............................................. B29C 45/14
[52] U.S. Cl. ...................................... 156/106; 156/107; 156/245; 156/298; 264/328.1; 296/84.1
[58] Field of Search ............... 156/106, 245, 293, 298, 156/107; 264/328.1, 328.4; 296/84.1, 89

[56] References Cited

U.S. PATENT DOCUMENTS

| | | | |
|---|---|---|---|
| 3,516,884 | 6/1970 | Heeter et al. | 156/106 |
| 3,919,022 | 11/1975 | Stefanik | 156/106 |
| 4,571,278 | 2/1986 | Kunert | 156/293 |
| 4,765,672 | 8/1988 | Weaver | 296/84.1 |

FOREIGN PATENT DOCUMENTS

59-199228 11/1984 Japan .
61-186619 11/1986 Japan .
2192658 1/1988 United Kingdom .

*Primary Examiner*—Caleb Weston
*Attorney, Agent, or Firm*—Fleit, Jacobson, Cohn, Price, Holman & Stern

[57] ABSTRACT

The invention relates to a method of fitting a plate member with at least one supportive or protective member of a synthetic resin by injection molding of the resin with insertion of, for each resin member, a predetermined marginal region of the plate member in the mold cavity. For example, a vehicle window glass is fitted with two holders to be coupled with a window regulator mechanism. To enhance strength of adhesion of the molded resin member(s) to the plate without making any mechanical or thermal treatment of the plate, the marginal region of the plate is closely covered with at least one sheet of plastic film, which has a thickness of 5 to 250 μm and becomes a melt adhesive to both the plate and the molded resin at a temperature in the range from 50° to 150° C., prior to insertion of the marginal region of the plate into the mold cavity. For example, the plastic film is of an ethylene base copolymer.

13 Claims, 1 Drawing Sheet

METHOD OF FITTING PLATE MEMBER WITH SUPPORTIVE OR PROTECTIVE MEMBER OF MOLDED RESIN

BACKGROUND OF THE INVENTION

This invention relates to a method of fitting a plate member with at least one supportive or protective member of a synthetic resin by molding the resin with insertion of a marginal region of the plate member in the mold cavity. A typical example of the plate member is a glass plate for use as a vehicle window glass which can be pulled up and down.

In manufacturing window glasses for openable windows of automobiles, a shaped glass plate is fitted with holders to be coupled with a window regulator mechanism. Currently the holders are usually made of a synthetic resin. Shaped glass plates for some windows are fitted with protective or cushioning moldings around edges of the plates.

One way of fitting a glass plate with a plastic member, which may be any of the aforementioned holders and moldings, is forming the plastic member as a separate part and then attaching that member to the glass plate by either an adhesive means or a mechanical fastening means. However, this is rather inconvenient for industrial manufacturing. In the case of using an adhesive, usually the plastic member needs to be formed with projections to prevent the adhesive from extending into unnecessary areas and minute undulations to augment the strength of adhesion. Besides, it takes a relatively long time to cure or solidify the applied adhesive, and in an extreme case there arises a discrepancy of curvature between the glass plate and the plastic member so that the obtained window glass does not fit in the window. Further, there is some possibility of detachment of the plastic member by deterioration of the adhesive bond. In the case of using a mechanical fastening means it is necessary to bore holes in the glass plate. The boring weakens the glass plate, and the tight clamping of the fastening means is liable to produce irregular stress around each hole in the glass plate.

Another way is accomplishing molding of the plastic member and bonding of the molded member to the glass plate simultaneously. That is, in molding the plastic member a predetermined region of the glass plate is kept inserted in the mold cavity. In general this method is advantageous over the method of attaching a separately formed member to a glass plate in respect of productivity and cost. Furthermore, it is possible to simplify the shape of and reduce the size of the plastic member. This very favorable for window glasses for recent automobiles in view of the current trend toward utilization of the space in a door frame for installation of various instruments or accessories and fitting of a door inner panel with various functional elements. However, in this method it is important to take an appropriate measure to ensure firm and reliable bonding of the molded resin member to the glass plate. In recent automobiles there is a trend toward enlargement of windows and reduction in the thickness of window glasses, and in hardtop cars and sashless cars which are increasing it is inevitable that a greater force acts on the window glass holders coupled with guide channels. Therefore the holders are required to very firmly adhere to the window glass.

JP-UM A No. 61-186619 shows fitting a vehicle window glass with holders by forming a hole or a recess in the glass plate in each marginal region where a holder is to be attached and performing injection molding of a synthetic resin to form the holders such that a portion of the injected resin enters the holes or recesses in the glass plate. However, this method entails the extra operation of machining the glass plate to form the holes of recesses, and the adhesion of the holders to the glass plate is not augmented in areas other than the holed or recessed areas.

JP-A No. 59-199228 shows producing an automobile opera window glass by fitting a cross-sectionally U-shaped covering formed of a rubber or a soft resin around the periphery of the glass plate, then performing injection molding of a hard resin or as to form a resin frame or molding over the elastic covering and subsequently removing edge portions of the elastic covering protruding from the overlying resin molding. The provision of the elastic covering is effective for prevention of appearance of burrs in the resin molding. However, the interposition of the elastic covering does not seen to be effective for enhancement of the strength of bond between the hard resin molding and the glass plate.

GB-A No. 2,192,658, which shows fitting a vehicle window glass with holders by inserting protruding marginal regions of the glass plate into the mold in molding the holders, proposes to form some projections in the edge portion of each of the aforementioned marginal regions so as to locally increase the thickness of the glass plate. Although a mechanical or thermal treatment of the glass plate is needed to form the proposed projections, the holders bond very securely to the glass plate as the thickness increased edge portion of the plate is embedded in each holder molded in situ.

SUMMARY OF THE INVENTION

The present invention is concerned with the method of fitting a plate member with at least one supportive or protective member of a synthetic resin by molding the resin with limited insertion of the plate member in the mold cavity, and it is an object of the invention to provide an improved method of the same category which is simple in operations and high in productivity and accomplishes very secure bonding of the molded member (s) to the plate.

The invention provides a method of fitting a plate member with a supportive or protective member of a synthetic resin in a predetermined marginal region of the plate member, the method having the steps of placing the marginal region of the place member in a cavity in a mold and then introducing a melt of the resin into the cavity. According to the invention, this method further comprises the step of closely covering the two opposite surfaces and the edge face of the marginal region of the plate member with at least one sheet of a plastic film, which has a thickness in the range from 5 to 250 μm and becomes a melt adhesive to both the plate member and the resin to be molded at a temperature in the range from 50° to 150° C., prior to the placement of the marginal region of the plate member in the mold cavity.

This invention is applicable to plate members of various materials and of various shapes, including flat plates and curved plates. In particular, various glass plates and various synthetic resin plates for use in furniture, buildings or vehicles are main objects of the practice of the invention. Usable glass plates include tempered or otherwise strengthened glass plates, laminated glass plates, mirrors, heat-reflecting or otherwise coated glass plates, multilayer glass plates and insulating glass panels. Typical examples of usable resin plates are methacrylic resin plates and polycarbonate plates, which may have coatings such as surface hardening coatings.

Every supportive or protective member molded and attached to a plate member by the method according to the invention has a recess which is U-shaped in cross sections such that a marginal portion of the plate member fits tightly in the recess. Needless to mention the present invention includes fitting a plate member with a plurality of supportive or protective members, and in such case the above stated molding operation using at least on sheet of a plastic film is made for each supportive or protective member. The position of the supportive or protective member(s) is arbitrary. For example, in the case of a pair of holders of a vehicle window glass the both holders will be provided on one side of a quadrilateral glass plate. In the case of a protective molding for a window glass the molding will be provided along at least one side of a quadrilateral glass plate, and sometimes around the entire periphery of the plate.

The plastic film used in the present invention is usually a film of a thermoplastic polymer or copolymer.

Usually an injection molding method is employed for molding the supportive or protective member(s).

In the method according to the invention the plastic film covering the plate member in the mold cavity turns into a sort of melt when a hot resin liquid is injected into the cavity, and the melted film strongly adheres to both the plate member and the resin solidfying in the cavity. Consequently the resin member formed by the molding operation bonds very firmly to the plate member, and the joint between the plate member and the molded resin member improves also in heat resistance, chemical resistance, weather resistance and hence in durability.

In the present invention there is no need of mechanical or thermal treatment of the plate member precedent to the molding operation. Of course this is favorable for reduction in production cost. Moreover, the invention makes it possible to reduce the thickness of the plate member since there is no cause of lowering the strength of the plate member. It is also possible to make the supportive or protective member(s) compact. Therefore, this invention has great merits when used in producing automobile window glass to be coupled with a window regulator mechanism. Besides, this invention is advantageously applicable to other various articles such as, for example, window glasses for vehicles and buildings, glass doors for buildings, glass doors of office or household furniture and mirrors.

DESCRIPTION OF THE PREFERRED EMBODIMENTS

Figure 1:
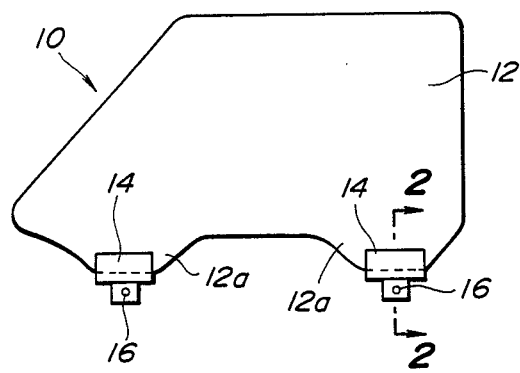
FIG. 1 is an elevational view of a vehicle window glass which is fitted with two holders by a method according to the invention.

As mentioned hereinbefore, this invention is applied mainly to glass plates and synthetic resin plates of various shapes.

For fitting a plate member with the desired supportive or protective member(s), an injection molding method such as reaction injection molding (RIM) method, reinforced RIM (R-RIM) method, liquid injection molding (LIM) method or reinforced LIM (R-LIM) method is employed. For molding supportive members generally called holders, either R-RIM method or R-LIM method is preferred. For molding protective members generally called moldings or gaskets, either RIM method or LIM method is suitable.

The synthetic resin to be molded can be selected from conventional thermoplastic and thermosetting resins such as, for example, polyacetal resins, polyester resins, polyamide resins, polyurethane resins, nylon-6, nylon-66, epoxy resins and polybutylene terephthalate resins. In some cases selection can be made from rubbers moldable by injection molding such as polyolefin rubbers, polyurethane rubbers and ethylene-vinyl acetate rubbers. Optionally, the resin may be reinforced with either an inorganic fiber such as glass fiber or an organic fiber such as aramid fiber. It is also optional to use any of conventional additives and fillers.

In this invention it is essentional to use a plastic film in the manner as stated hereinbefore. The plastic film is required to become a melt adhesive to both the plate member and the molded resin at a temperature in the range from 50° to 150° C. Preferred examples of the material of the plastic film are ethylene base copolymers such as ethylene/vinyl acetate copolymers and ethylene/acrylic ester/maleic anhydride copolymers and polyvinyl butyral. In some cases it is possible to use a polyurethane resin film.

A plastic film that becomes a melt and serves as an adhesive at 50°-150° C. is used considering that in most cases the temperature of the resin under molding ranges from about 60° C. to about 250° C. That is, the plastic film should melt and exhibit adhesive capability at a temperature lower than the resin molding temperature, and maximum merits of using the plastic film are gained when that temperature of the plastic film is lower than the resin molding temperature by 10° to 100° C. That temperature of the plastic film should be selected with consideration of related factors such as the kinds of the molding resin and the film material, thickness of the film and temperature of the mold (usually 50°-100° C.).

The thickness of the plastic film is 5 to 250 μm. When a plastic film thinner than 5 μm is used it is difficult to keep the film applied to the plate member stably in position at the molding operation. The strength of bond between the plate member and the molded resin member(s) may not appreciably be enhanced by using a plastic film thicker than 250 μm or thinner than 5 μm. In this invention it is permissible to use several sheets of plastic film in the manner of lamination, with proviso that each sheet 5-250 μm in thickness. In such a case it is preferred that the total thickness of the sheets of film does not exceed 250 μm. It is desirable to use 1 to 3 sheets of plastic film each having a thickness of from 15 to 75 μm and preferably from 20 to 50 μm.

In covering a predetermined marginal region of the plate member with a plastic film there is no need of applying an adhesive between the plate and the film. It suffices that the film closely covers that region of the plate without slacking. However, for the purpose of surely preventing displacement of the plastic film on the plate member it is desirable to apply a primer to the marginal region of the plate member or to make an acid treatment or a silane treatment of that region of the plate member in advance of covering with the plastic film.

EXAMPLE

Figure 2:
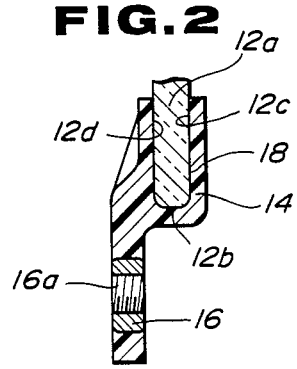
FIG. 2 is a fragmentarily enlarged sectional view taken along the line 2—2 in FIG. 1.

FIG. 1 shows a window glass 10 for an automobile window. The body of the window glass 10 is a glass plate 12 of a trapezoidal shape. On its lower side the glass plate 12 has two downwardly protruding portions 12a, and in each of these two portions 12a the glass plate 12 is fitted with a holder 14 to be coupled with a window regulator mechanism. The holders 14 are formed of a synthetic resin. As shown in FIG. 2, each holder 14 is formed with a recess U-shaped in cross sections such that is protruding portion 12a of the glass plate is partly received in that recess. That is, in the area where each holder 14 exists, the edge face 12b and the outer and inner surfaces 12c and 12d of the glass plate are tightly covered by the holder 14. At a short distance from the edge 12b of the glass plate, a metal part 15 having a threaded hole 16a is inserted in the holder 14 to fix the holder 14 to a guide channel member.

Figure 3:
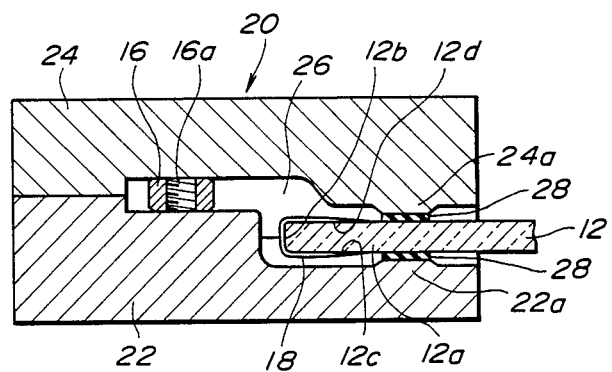
FIG. 3 shows, in a schematic and sectional view, a mold for molding a synthetic resin into the holders shown in FIGS. 1 and 2 and the manner of placing a marginal portion of the window glass in the mold cavity after closely covering that portion of the window glass with a plastic film.

FIG. 3 shows a metal mold 20 for molding each of the holders 14 so as to simultaneously accomplish bonding of the molded holder to the glass plate 12 in the manner shown in FIGS. 1 and 2. The mold 20 is a split mold comprised of a core block 22 a cavity block 24 which can be separated from the core block 22. The two blocks 22, 24 of the mold 20 are designed such that a mold cavity 26 for forming each holder 14 is created when the mold 20 is closed with insertion of a predetermined marginal region of each protruding portion 12a of the glass plate 12.

At least the aforementioned predetermined marginal region of the protruding portion 12a of the glass plate 12 is closely covered with a plastic film 18. That is, a sheet of plastic film 18 is folded so as to make contact with the two opposite surfaces 12c, 12d and edge face 12b of the glass plate 12. If desired, two or three sheets of plastic film are used to cover the same part of the glass plate double or trebly. With the plastic film 18 in such disposition, the glass plate 12 is brought into engagement with the core block 22 of the mold 20 in the open state so as to rest on a land 22a of the core block 22 in a predetermined region of each of the protruding portions 12a. The land 22a is covered with a seal layer 28. Thus the marginal part of the glass plate covered with the plastic film 18 enters the recess in the core block 22. The metal part 16 to be inserted in each holder 14 is placed at a predetermined position on the core block 22. Next, the cavity block 24 is brought into contact with the core block 22. Then a land 24a of the cavity block 24, which is covered with a seal layer 28 and located opposite to the land 22a of the core block 22, comes into contact with the glass plate 12. By clamping the two blocks 22, 24 of the mold 20 the glass suplate 12 is tightly held between the seal layers 28 of the respective blocks 22, 24, and the cavity 26 is created. The plastic film 18 may be broad enough to be clamped by the seal layers 28 in the mold 20. The seal layers 28 are formed of, for example, silicone resin, silicone rubber, fluororesin or fluororubber. As can be seen, in this method the cavity 26 in the closed mold 20 is partly defined by the glass plate surfaces covered with the plastic film 18.

After the above preparatory steps, a melted resin is injected into the cavity 26 from an injection molding machine through a sprue gate (not shown) of the mold 20. It is possible to mold the two holders 14 in a single mold in which two separate cavities are defined. If necessary the mold may have two sprue gates at suitable locations. It is also possible to form a protective molding around the entire periphery of the plate member by using a mold in which a cavity is defined around the plate member. In such a case, the mold may have more than two sprue gates at suitable intervals along the periphery of the plate member. In any case the temperature of each block of the mold is appropriately controlled so as to accomplish good molding and so as not to apply thermal shocks to the plate member. It is a matter of course to suitably control other items of molding conditions such as the temperature of the injected resin and the rate of injection.

The mold 20 is opened after solidification of the resin injection into the cavity 26. Then, each holder 14 is obtained in the state bonded to the glass plate 12 as shown in FIGS. 1 and 2.

By the above described method, samples of the window glass 10 of FIG. 1 where produced by alternately using a polyamide resin and a multicompoent resin comprised of 80 wt % of nylon-66 and 20 wt % of a ternary copolymer of ethylene, acrylic ester and maleic anhydride, with addition of about 25 wt % of glass fiber to each resin, as the material of the holders 14 and a film of a ternary copolymer of ethylene, acrylic ester and maleic anhydride as the plastic film 18. The thickness of the film was 50 μm, and only a sheet of this film was used in some cases and two sheets of the same film in other cases. In every case the mold temperature was about 80° C., and the temperature of the injected resin was about 240° C. For comparison, some samples were produced without using the plastic film 18.

On the window glass samples produced by using either one sheet or two sheets of the ternary copolymer film, shear strength of each of the molded holders 14 was about 13 kg/cm$^2$ at the lowest. The strength of adhesion of each holder 14 to the glass plate 12 indicated by this shear strength value is remarkably high by comparison with the maximum adhesion strength attained by attaching separately molded holder to a glass plate with an adhesive. In contrast, on the samples produced without using the plastic film, shear strength of each holder 14 was about 1.2 to 1.5 kg/cm$^2$ at the best.

For comparison, a polyvinyl butyral resin film and a polyacetal resin film both of which had thickness of about 300–350 μm were alternately used in place of the aforementioned ternary copolymer film (50 μm). Except the change in this point, the above method and conditions of producing samples of the window glass 10 were unchanged. In these cases the use of the plastic films did not appreciably enhanced shear strength of each holder 14.

What is claimed is:

1. In a method of fitting a plate member with a supportive or protective member of a synthetic resin in a predetermined marginal region of the plate member, the method having the steps of placing the marginal region of the plate member in a cavity in a mold and then introducing a melt of the resin into the cavity, the improvement comprising closely covering the two opposite surfaces and the edge face of said marginal region of the plate member with at least one sheet of a plastic film, which has a thickness in the range from 5 to 250 μm and becomes a melt adhesive to both the plate member and said resin at a temperature in the range from 50° to 150° C., prior to the placement of said marginal region of the plate member in said cavity in the mold.

2. A method according to claim 1, wherein at least two sheets of said plastic film are used in the manner of lamination to cover said surfaces and said edge face on condition that the total thickness of said at least two sheets of said plastic film is not greater than 250 μm.

3. A method according to claim 1, wherein said plastic film has a thickness in the range from 15 to 75 μm.

4. A method according to claim 3, wherein 2 or 3 sheets of said plastic film are used in the manner of lamination to cover said surfaces and said edge face.

5. A method according to claim 1, wherein the material of said plastic film is selected from the group consisting of polyvinyl butyral, copolymer of ethylene and vinyl acetate, copolymer of ethylene, acrylic ester and maleic anhydride, and polyurethane.

6. A method according to claim 1, wherein said synthetic resin is selected from the group consisting of polyacetal resins, polyester resins, polyamide resins, polyurethane resins, epoxy resins, nylon-6, nylon-66 and polybutylene terephthalate resins.

7. A method according to claim 1, wherein said synthetic resin is a thermoplastic synthetic rubber.

8. A method according to claim 1, wherein said synthetic resin is a fiber reinforced resin.

9. A method according to claim 1, wherein said plate member is a glass plate.

10. A method according to claim 9, wherein said plate member is shaped for use as a vehicle window glass.

11. A method according to claim 10, wherein said supportive or protective member is a holder to be coupled with a window regulator mechanism.

12. A method according to claim 10, wherein said supportive or protective member is a molding formed along at least a part of the periphery of the glass plate.

13. A method according to claim 1, wherein said plate member is a synthetic resin plate.

* * * * *